United States Patent [19]

Wolf et al.

[11] Patent Number: 4,561,565
[45] Date of Patent: Dec. 31, 1985

[54] RATE ADJUSTMENT FOR CHEMICAL METER

[75] Inventors: Lester C. Wolf; William R. Lundie, both of East Moline, Ill.

[73] Assignee: Deere & Company, Moline, Ill.

[21] Appl. No.: 546,689

[22] Filed: Oct. 28, 1983

[51] Int. Cl.$^4$ ............................................. B67D 5/22
[52] U.S. Cl. ......................................... 222/28; 222/46; 222/314; 116/231; 116/315; 74/553
[58] Field of Search ............ 222/28, 46, 41, 23, 222/25, 43, 47, 282, 311, 312, 314, 315, 410, 411, 285, 305, 306; 239/650, 681; 116/230, 231, 307, 309, 315; 74/553, 10.2, 10.15, 10.22, 10.41, 10.45

[56] References Cited

U.S. PATENT DOCUMENTS

| | | | |
|---|---|---|---|
| 2,619,849 | 12/1952 | Trexler | 222/28 |
| 3,178,079 | 4/1965 | Johnson | 222/44 X |
| 3,190,506 | 6/1965 | Selzler | 222/314 |
| 3,568,629 | 3/1971 | Porter | 116/124 |
| 3,662,922 | 5/1972 | Gesior | 222/46 |
| 3,857,360 | 12/1974 | Tonari et al. | 116/124.2 |
| 3,982,670 | 9/1976 | Brass | 222/177 |
| 4,234,105 | 11/1980 | Viramontes | 222/233 |

OTHER PUBLICATIONS

Deere & Co., Operator's Manual, OM-A45513 Issue E2, p. 128, (May 1982).
Gandy Company, brochure, Form CRA 9-80-DM, pp. 2, 3 and 7 (Date unknown).
International Agricultural Equipment, brochure, AD-33832-K1 5/80, p. 13 (Date unknown).
H. Mabie & F. Ocvirk, Mechanisms and Dynamics of Machinery, pp. 33-35 (3d Ed. 1975).

*Primary Examiner*—H. Grant Skaggs
*Assistant Examiner*—Louise S. Heim
*Attorney, Agent, or Firm*—Henderson & Sturm

[57] ABSTRACT

A material metering device having a discrete flow rate adjustment and indicator mechanism. The indicator includes an actuator knob which is rotated to adjust the flow rate of material from the meter. The actuator knob is also operably connected to a follower wheel which is rotated by movement of the actuator knob. Indicia on both the actuator knob and follower wheel are simultaneously registerable with a reference point, such as a viewing window, and the reading of the indicia at the reference point indicates the flow rate of material from the meter.

14 Claims, 9 Drawing Figures

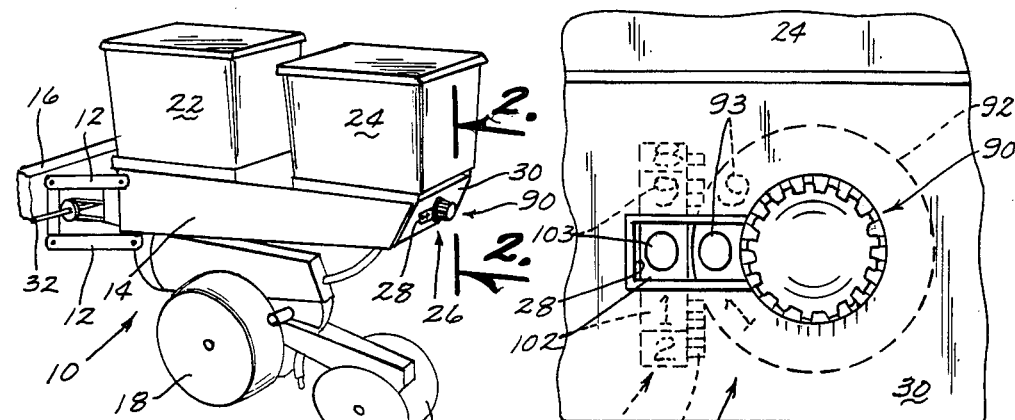

RATE ADJUSTMENT FOR CHEMICAL METER

TECHNICAL FIELD

This invention relates to chemical material metering devices of the type used in conjunction with agricultural planting units to regulate the application rate of chemicals during the planting operation, and more particularly to material metering devices having flow rate adjustment and indicator mechanisms.

BACKGROUND ART

Chemical material metering devices are used to meter chemicals, such as granular insecticides or herbicides, at the application rate recommended by the chemical supplier. Typically, a chemical storage hopper carries a supply of material that is fed by gravity into a metering device located at the bottom of the storage hopper.

One conventional metering device includes a feed wheel or agitator that is disposed to rotate over a metering orifice to feed material through the orifice. The size of the metering orifice is controlled by adjusting a metering gate or slide; and an indicator mechanism is provided so that the operator can visually observe the adjusted position of the metering gate; and thereby determine the flow rate of material from the meter.

Presently known adjustment indicators include a lever disposed to engage one of a plurality of numbered notches, a micrometer-type indicator, and a rotatable cam having numbered lines registerable with a cam stop. All of these known indicators are difficult to read and are difficult to set and maintain at a desired setting.

Those concerned with these and other problems recognize the need for an improved material metering device.

DISCLOSURE OF THE INVENTION

The present invention provides a material metering device employing a flow rate adjustment and indicator mechanism that simultaneously displays two large indicia, such as numerals, through a viewing window. An actuator knob is operably attached to a gate or slide that adjusts the size of a discharge orifice thereby regulating the flow rate through the orifice. The actuator knob is also operably connected to a follower wheel such that the follower wheel is rotated in response to a rotation of the actuator knob. Numerical indicia are spaced about a peripheral flange on the knob, such that one of the numerals is visible through a window. Also, numerical indicia are spaced about the rim of the follower wheel and one of the numerals is visible through the window adjacent the actuator numeral. As the actuator knob is rotated, progressively increasing the size of the discharge opening, progressively higher numerals appear in the window. The numerals are visible to the operator and provide a clear reading which indicates the rate of flow of material from the meter.

Also, the actuator knob and the follower wheel both include means for releasably retaining the knob and the wheel in one of a plurality of discrete positions corresponding to the registry of the numerals in the viewing window. This discrete positioning insures that complete numerals are squarely positioned in the viewing window so that the numerals can be easily seen by the operator. Further, the discrete positioning of the actuator knob insures that the knob will not be inadvertently rotated once a desired setting has been made.

An object of the present invention is to provide an improved material metering device.

Another object of the present invention is the provision of a material metering device having a flow rate indicator which is easily read by the operator.

A further object of the present invention is to provide a material metering device which can be easily and conveniently set to yield a discrete repeatable flow rate.

A still further object of the present invention is the provision of a material metering device which can be easily and quickly set to yield uniform material application rates for a plurality of row units.

Other objects, advantages and novel features of the present invention will become apparent from the following detailed description of the invention when considered in conjunction with the accompanying drawings.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of a planting unit employing the material metering device of the present invention;

FIG. 2 is a greatly enlarged rear elevational view taken along line 2—2 of FIG. 1 showing a cutaway portion of the chemical hopper support bracket through which the actuator knob extends and the indicia on the actuator knob and follower wheel are visible;

FIG. 3 is a perspective view of the material metering device of the present invention;

FIG. 4 is an exploded perspective view thereof;

BEST MODE FOR CARRYING OUT THE INVENTION

Figure 5:
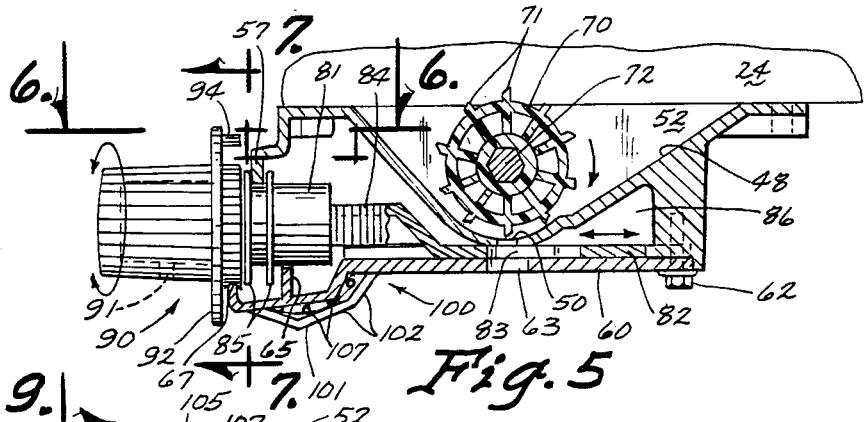
FIG. 5 is a side elevation sectional view taken along line 5—5 of FIG. 3.

Referring now to the drawings, wherein like reference numerals designate identical or corresponding parts throughout the several views, FIG. 1 shows a planting unit (10) mounted by parallel linkage bars (12) which interconnect the subframe (14) of the planting unit (10) to a main frame (16). The parallel linkage bars (12) provide for independent vertical movement of the planting unit (10) with respect to other planting units carried by the main frame (16).

The subframe (14) is supported by a pair of adjustable gauge wheels (18) which control the depth of the furrow opening disks (not shown). A pair of closing wheels (20) are supported by the subframe (14) rearwardly of the gauge wheels (18). The closing wheels (20) exert a downwardly and inwardly directed force adjacent the formed furrow sufficient to collapse the formed furrow wall to provide a uniform soil cover for the deposited seeds.

The upper portion of the subframe (14) supports a seed hopper (22) including a seed meter (not shown), and a granular chemical hopper (24) including a material metering device (26) which is visible through a window opening (28) in the rear hopper support bracket (30) (FIG. 2). Both the seed meter and the chemical material meter (26) are operably connected to a main drive (32) (FIG. 1).

Referring now to FIGS. 3 and 4, the material metering device (26) includes a housing (34), a feed wheel assembly (36), a slideable metering gate assembly (38), and a flow rate adjustment and indicator mechanism (40).

As most clearly shown in FIGS. 4 and 5, the housing (34) includes a main body portion (42) and a bottom cover plate (44). The housing body (42) has a top rim (46) including a number of threaded openings (47) by which the housing body (42) is attached by conventional means to the bottom of the chemical hopper (24). Downwardly converging interior walls (48) converge toward an elongated discharge orifice (50) and opposing sidewalls (51) and (52) include circular openings (53), each of which has a pair of oppositely directed notches (54). Sidewall (52) also includes a threaded opening (55) and an assembly alignment opening (56). The rear wall (57) has a semicircular recess (58) formed in the lower portion thereof. The bottom cover plate (44) includes a planar section (60) having openings (61) formed therein for attachment by bolts (62) to the lower portion of the housing body (42). Also formed in the planar section (60) is an elongated slot (63) which is disposed directly below the elongated discharge orifice (50) when the housing (34) is assembled (FIG. 5). A downwardly offset projection (64) extends from the planar section (60) and supports an upwardly directed intermediate tab (65) having a concave end (66) and an upwardly directed end tab (67) having a convex end (68).

The feed wheel assembly (36) is best shown in FIG. 4. A feed wheel or agitator (70) having radially extending fins (71) is disposed for rotational movement directly above and adjacent to the discharge orifice (50) (FIG. 5). The feed wheel (70) is carried on a shaft (72) which is journalled in opposing housing sidewall openings (53) by a large bearing (73) received within each of the sidewall openings (53) and a small bearing (74) received within the large bearing (73). Washers (75) are disposed adjacent the small bearings (74) and cotter pins (76) secure the shaft (72) for rotational movement with respect to the housing body (42). A driven spur gear (77) is attached to one end of the shaft (72) by a set screw (78) and is operably connected to the main drive (32) (FIG. 1).

The slideable metering gate assembly (38) includes a metering gate (80) and an adjusting nut (81). As best shown in FIGS. 4 and 5, the metering gate (80) is slideably received in the housing (34) intermediate the downwardly converging housing walls (48) and a bottom cover plate (44). The metering gate (80) includes a planar section (82) having a generally "Y"-shaped metering opening (83) formed therein, and an upwardly offset threaded shank (84). An internally threaded adjusting nut (81) is disposed to receive the threaded shank (84). The adjusting nut (81) includes a pair of external flanges (85) that are disposed on opposite sides of the housing rear wall (57) adjacent the semicircular recess (58), thus restraining the adjusting nut (81) against axial movement (FIG. 5). The concave end (66) of tab (65) receives and supports the adjusting nut (81) in aligned position within the housing (34). The metering gate (80) is selectively movable between a first position wherein the threaded shank (84) is extended from the adjusting nut (81) so that a solid portion of the planar section (82) underlies the housing discharge orifice (50) and prevents flow of material from the housing (34); and a second position wherein the threaded shank (84) is fully retracted into the adjusting nut (81) such that the widest portion of the "Y"-shaped metering opening (83) underlies the discharge orifice (50) allowing for the maximum flow rate of material from the housing. FIG. 5 illustrates the metering opening (50) in a position intermediate the closed and fully open positions and the directional area (86) indicates the slideable movement of the metering gate (80).

Figures 6, 8:
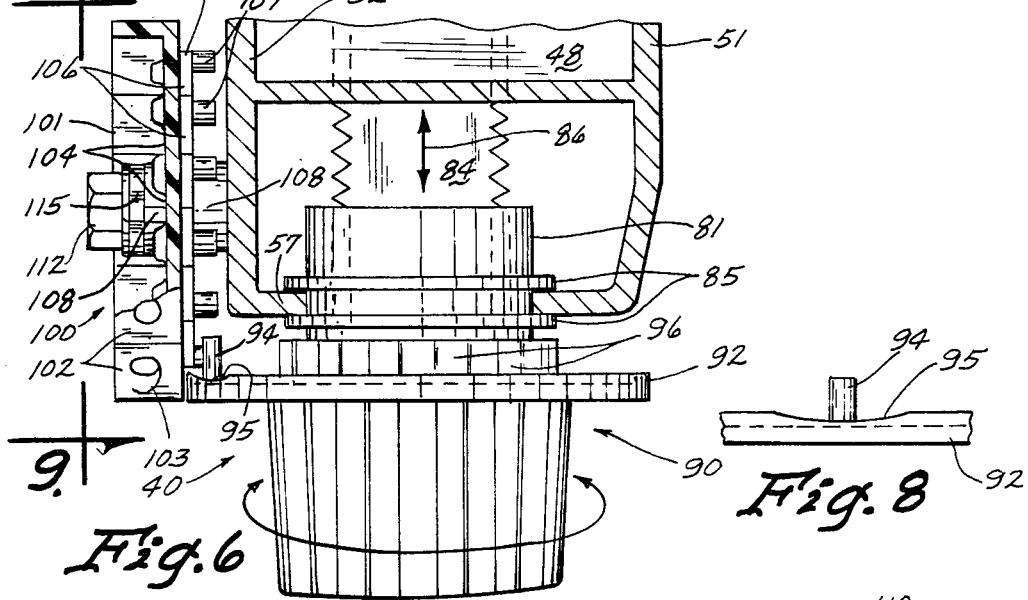
FIG. 6 is an enlarged top plan sectional view taken along line 6—6 of FIG. 5.
FIG. 8 is a side elevational view taken along line 8—8 of FIG. 7.
Figures 7, 9:
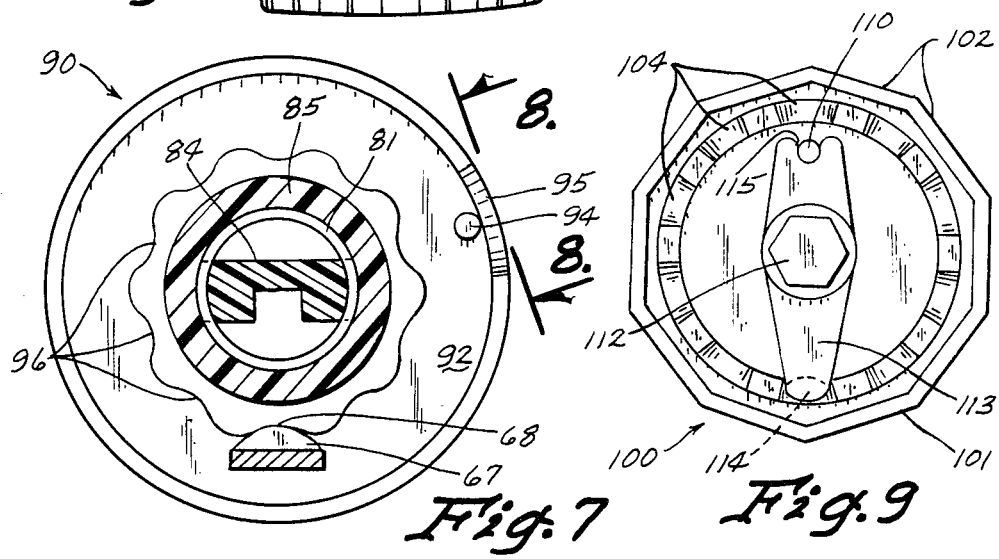
FIG. 7 is an enlarged front elevational view taken along line 7—7 of FIG. 5.
FIG. 9 is a side elevational view taken along line 9—9 of FIG. 6.

The flow rate adjustment and indicator mechanism (40) includes an actuator knob (90) and a follower wheel (100). The actuator knob (90) is attached by a set screw (91) to the adjusting nut (81) (FIG. 4). The actuator knob (90) includes a circular flange (92) having actuator indicia (93) spaced around the outer face thereof. A drive lug (94) extends out from a relieved area (95) on the inner face of the circular flange (92) near its edge (FIGS. 7 and 8). A series of radially directed recessed scallops (96), each corresponding to an actuator indicium (93), are spaced around the central portion of the inner face of flange (92). The scallops (96) are disposed to be releasably engaged by the convex end (68) of tab (67) (FIGS. 5 and 7).

As most clearly shown in FIG. 4, the follower wheel (100) includes a peripheral rim (101) formed by a series of spaced flats (102), each having a follower indicium (103) thereon. The outer face of the follower wheel (100) carries a series of axially directed recessed scallops (104) spaced inwardly from the flats (102). Each of the scallops (104) correspond to a follower indicium (103) (FIG. 9). A recessed lip (105), having flats (106) corresponding to rim flats (102), extends out from the inner face of the follower wheel (100) and a driven lug (107) extends out from the center of each flat (106) (FIG. 6). An axially directed spacer flange (108) extends from the central opening (109) of the follower wheel (100) and an alignment opening (110) is formed through the body thereof.

The follower wheel (100) is mounted for rotational movement on a bushing (111) which is secured to the housing body (42) by engagement of a bolt (112) in a threaded opening (55) (FIG. 4). The bushing (111) is secured against rotation with respect to the housing body by frictional engagement with the head of bolt (112). An arm (113) extends radially from one end of the bushing (111) and includes an inwardly directed convex tab (114) which releasably engages the scallops (104) on the follower wheel (100). The arm (113) also includes an alignment notch (115) used to properly position the components during initial assembly by aligning the notch (115) with both the follower wheel alignment opening (110) and the housing alignment opening (56).

As best shown in FIG. 6, the actuator knob (90) is disposed to rotate about an axis which is perpendicular to the axis of rotation of the follower wheel (100). Also, the plane of rotation of the follower wheel, (100) is tangentially disposed to the actuator flange (92) (FIG. 2) and the rearward edge of the follower wheel (100), defined by one of the rim flats (102), is positioned adjacent to the actuator flange (92) at the point of tangency. Also, the inner surface of the actuator flange (92) contacts a flat (106) of the recessed lip (105) and restrains the follower wheel (100) against inadvertent rotation.

Although it is to be understood that various indicia can be used, the operation of the invention is described herein with both the actuator indicia and follower indicia represented by the numerals "0" through "9". Also, for purposes of illustration, the adjacent positioning of the numeral "0" on the actuator knob (90) and the numeral "0" on the follower wheel (100), as shown in FIG. 2, represents an indication of the first closed position wherein the flow of material from the housing (34) is prevented. Thus described, the material metering device of the present invention provides for the adjustment of the flow rate of material by slideable adjustment of the metering gate (80) between a first position wherein the discharge orifice (50) is closed and a second position wherein the discharge orifice (50) is fully open. Each of the 100 discrete incremental positions is clearly indicated to the operator by the highly visible numerals appearing in the window (28) in the rear hopper support bracket (30) (FIG. 2).

In operation starting from the first closed position, the numeral "0" on the actuator knob (90) and the numeral "0" on the follower wheel (100) are visible through the window (28) indicating a "00" reading. Rotating the actuator knob (90) one-tenth of a revolution results in an "01" reading. As the actuator knob (90) is rotated the convex end (68) of end tab (67) springs out of one scallop (96) into the next adjacent scallop (FIG. 7). This results in a discrete movement of the actuator numerals so that they are clearly visible through the window (28). Also, this results in a discrete repeatable movement of the metering gate (80).

The drive lug (94) is positioned in the relieved area (95) on the inner surface of the actuator flange (92) between the numerals "0" and "9". When the actuator knob (90) is rotated such that the actuator numeral in the window (28) moves from "9" to "0", the drive lug (94) engages one of the driven lugs (107) and rotates the follower wheel (100) one-tenth of a revolution and advances the follower numeral to the next higher digit. Likewise, moving the actuator numeral for "0" to "9" rotates the follower wheel (100) such that the next lower digit is displayed in the window (28). The relieved area (95) adjacent the drive lug (94) allows the free rotation of the follower wheel (100) from one interior flat (106) to the next adjacent interior flat by interrupting the contact of the inner surface of the actuator flange (92) and allowing the point formed by the juncture of adjacent interior flats (106) to rotate through the relieved area (95). As the follower wheel (100) is rotated the convex tab (114) springs from one follower scallop (104) into the next adjacent scallop (FIG. 9) resulting in discrete movement of the follower numerals. The discrete movement of both the actuator numerals and the follower numerals eliminates the possibility that only portions of two adjacent actuator numerals or two adjacent follower numerals will be visible through the window (28), thereby obscuring the reading.

The material metering device can be set at a desired flow rate and can be easily adjusted to other flow rates to accommodate varying conditions or materials. Since the actuator knob (90) is held in one of one hundred discrete positions, the flow rate, once set, is not susceptible to inadvertent change due to equipment vibration or the like. Also, a number of material meters can be easily and quickly set at identical flow rates to yield uniform material application rates for a number of row units.

Thus, it can be seen that at least all of the stated objectives have been achieved.

Obviously, many modifications and variations of the present invention are possible in light of the above teachings. It is therefore to be understood that, within the scope of the appended claims, the invention may be practiced otherwise than as specifically described.

We claim:

1. In a material metering device including a housing having a discharge orifice and means for regulating the rate of flow of material from the housing through the discharge orifice, the flow rate regulating means being selectively movable between a first position wherein the discharge orifice is closed and a second position wherein the discharge orifice is fully open, the improvement comprising:

a rotatable actuator operably connected to the flow rate regulating means, said actuator having actuator indicia spaced thereon, said actuator indicia being selectively registerable with a predetermined reference point;

a rotatable follower wheel attached to said housing and operably connected to said actuator and being movable in response to the rotational movement of said actuator, said follower having follower indicia spaced thereon, said follower indicia being selectively registerable with said predetermined reference point and said actuator indicia and a drive lug attached to and extending out from said actuator, and a plurality of driven lugs attached to and extending out from said follower wheel, wherein said drive lug is disposed to contact one of said driven lugs and rotate said follower wheel when said drive lug is rotated past said predetermined reference point.

2. The material metering device of claim 1 further including means for releasably retaining said actuator in one of a plurality of discrete positions corresponding to the registry of one of said actuator indicia with said reference point.

3. The material metering device of claim 1 further including means for releasably retaining said follower in one of a plurality of discrete positions corresponding to the registry of one of said follower indicia with said reference point.

4. The material metering device of claim 1 wherein said actuator is disposed to rotate about an axis which is perpendicular to the axis of rotation of said follower.

5. The material metering device of claims 1 or 4 wherein said actuator includes a circular flange having an outer face and wherein said actuator indicia are spaced about said outer face of said flange.

6. The material metering device of claims 1 or 4 wherein said follower includes a peripheral rim and wherein said follower indicia are spaced about said rim.

7. The material metering device of claim 5 wherein the plane of rotation of the follower rim is tangentially disposed to the actuator flange such that the outer face of said actuator flange and the rearward edge of said follower rim are adjacently disposed at a point of tangency.

8. The material metering device of claim 7 wherein said predetermined reference point is said point of tangency.

9. The material metering device of claim 1 wherein said actuator indicia are the numerals "0" through "9", and wherein said follower indicia are the numerals "0" through "9".

10. The material metering device of claim 2 wherein said actuator retaining means includes a plurality of recessed scallops spaced about said actuator, and a resilient extension attached to said housing and disposed to releasably engage said actuator scallops as said actuator is rotated.

11. The material metering device of claim 3 wherein said follower retaining means includes a plurality of recessed scallops spaced about said follower, and a resilient extension attached to said housing and disposed to releasably engage said follower scallops as said follower is rotated.

12. The material metering device of claim 9 wherein the numeral "0" of the follower and the numeral "0" of the actuator are in registry with said predetermined reference point when the discharge orifice is closed, and wherein the numeral "9" of the follower and the numeral "9" of the actuator are in registry with said predetermined reference point when the discharge orifice is fully open.

13. The material metering device of claim 6 wherein the plane of rotation of the follower rim is tangentially disposed to the actuator flange such that the outer face of said actuator flange and the rearward edge of said follower rim are adjacently disposed at a point of tangency.

14. The material metering device of claim 13 wherein said predetermined reference point is said point of tangency.

* * * * *